(12) United States Patent
Fang et al.

(10) Patent No.: US 8,645,879 B2
(45) Date of Patent: Feb. 4, 2014

(54) ALGORITHM OF CU INTERCONNECT DUMMY INSERTING

(71) Applicant: Shanghai Huali Microelectronics Corporation, Pudong (CN)

(72) Inventors: Jingxun Fang, Shanghai (CN); Hsusheng Chang, Shanghai (CN); Yungchieh Fan, Shanghai (CN)

(73) Assignee: Shanghai Huali Microelectronics Corporation, Pudong, Shanghai (CN)

( * ) Notice: Subject to any disclaimer, the term of this patent is extended or adjusted under 35 U.S.C. 154(b) by 0 days.

(21) Appl. No.: 13/731,128

(22) Filed: Dec. 31, 2012

(65) Prior Publication Data

US 2013/0227502 A1 Aug. 29, 2013

(30) Foreign Application Priority Data

Feb. 28, 2012 (CN) .......................... 2012 1 0049162

(51) Int. Cl.
*G06F 17/50* (2006.01)
(52) U.S. Cl.
USPC .............................................. 716/54; 716/55
(58) Field of Classification Search
USPC ..................................................... 716/54, 55
See application file for complete search history.

(56) References Cited

U.S. PATENT DOCUMENTS

| | | | |
|---|---|---|---|
| 2009/0037864 A1* | 2/2009 | Becker et al. | 716/11 |
| 2011/0161909 A1* | 6/2011 | Becker et al. | 716/122 |
| 2011/0289471 A1* | 11/2011 | Anikin et al. | 716/132 |
| 2012/0174050 A1* | 7/2012 | Koti et al. | 716/113 |

FOREIGN PATENT DOCUMENTS

| | | |
|---|---|---|
| CN | 101231667 B | 11/2011 |
| CN | 102543853 A | 7/2012 |

* cited by examiner

*Primary Examiner* — Suresh Memula
(74) *Attorney, Agent, or Firm* — Prakash Nama; Global IP Services, PLLC

(57) ABSTRACT

The present invention disclosed an algorithm of Cu interconnect dummy inserting, including: divide the surface of semiconductor chip into several square windows with an area of A, each of which is non-overlap; perform a logic operation on each square window; and divide the window into two parts: ① the area to-be-inserted; ② the non-inserting area; determine the metal density of the dummy pattern that should be inserted to each square window and the line width; determine the dummy pattern that should be inserted to the windows according to the metal density, line width, the pre-set dummy pattern and the layouting rules. The beneficial effects of the present invention is: avoided the shortcomings of fill density maximization in the rule-based filling method by using reasonable metal density and line width. And with a combination of the influence of line width and density to the copper plating process and chemical mechanical polishing morphology in model-based filling method, it can achieve a better planarization effect.

7 Claims, 3 Drawing Sheets

| $A_{1,1}$ | | | | | | | $A_{1,n}$ |
|---|---|---|---|---|---|---|---|
| | ... | | | | | ... | |
| | | $A_{i-2,j-2}$ | $A_{i-2,j-1}$ | $A_{i-2,j}$ | $A_{i-2,j+1}$ | $A_{i-2,j+2}$ | |
| | | $A_{i-1,j-2}$ | $A_{i-1,j-1}$ | $A_{i-1,j}$ | $A_{i-1,j+1}$ | $A_{i-1,j+2}$ | |
| | | $A_{i,j-2}$ | $A_{i,j-1}$ | $A_{i,j}$ | $A_{i,j+1}$ | $A_{i,j+2}$ | |
| | | $A_{i+1,j-2}$ | $A_{i+1,j-1}$ | $A_{i+1,j}$ | $A_{i+1,j+1}$ | $A_{i+1,j+2}$ | |
| | | $A_{i+2,j-2}$ | $A_{i+2,j-1}$ | $A_{i+2,j}$ | $A_{i+2,j+1}$ | $A_{i+2,j+2}$ | |
| | ... | | | | | ... | |
| $A_{n,1}$ | | | | | | | $A_{n,n}$ |

ALGORITHM OF CU INTERCONNECT DUMMY INSERTING

RELATED APPLICATION

Benefit is claimed under 35 U.S.C 119(a)-(d) to Foreign Application Serial No. 201210049162.5, filed in CHINA, entitled "AN ALGORITHM OF CU INTERCONNECT DUMMY INSERTING" by Shanghai Huali Microelectronics Corporation, filed on Feb. 28, 2012, which is herein incorporated in its entirety by reference for all purposes.

TECHNICAL HELD

The present invention is related to the integrated circuit manufacturing technology field, especially an algorithm of Cu interconnect dummy inserting.

BACKGROUND

With the continuous development of integrated circuit manufacturing technology and the improvement of the integrated level of the chip, three-dimension and multi-layer configuration is widely used in back-end interconnect. Meanwhile, copper interconnects become the mainstream interconnect technology in the manufacture of integrated circuit because it has lower resistivity, better anti-migration, and it's more conducive to increase device density than aluminum, more conductive to increase the clock frequency, more conductive to reduce power consumption and cost. The Damascene process works as the essential technology of realizing multilayer copper metal interconnection comprising a series of process: insulator dielectric layer deposition process; trench & contact hole etch; depositing of metal diffusion barrier layer and copper seed layer; Electrochemical Plating (ECP) craft of copper; Chemical Mechanical Polishing (CMP) of copper, etc. Among them, the CMP which works as a unique global planarization process is a key technology of realizing copper interconnects.

But the surface morphology, the copper connectivity and the thickness of the insulating dielectric layer exist very related variation with the layout Post-CMP. As FIG. 1 illustrated, some area such as high density area of wide line or graphics will appear in phenomenon like dishing defect or erosion, which become the serious flaws of affecting the flatness of Post-CMP.

The surface profile post-ECP, the grinding characteristics of CMP, the Surface material of chip and many other factors will affect the profile of Post-CMP. Thereinto, the ECP profile and the grinding characteristics of CMP are directly affected by the graphical features of metal wire's area density, line width, spacing, etc, which result in the strong correlation between dishing defect of Post-CMP, erosion and graphics. The cross-sectional area of interconnect line will reduce and the resistance value will increases because of the dishing defect and the erosion defect.

The studies show that in the case of different spacing distance and line width the influence of dishing defect on the resistance of the interconnect lines is from 28.7% to 31.7% and the influence on the resistance also becomes large with the increase of line width. In addition, as FIG. 2 illustrated, post-CMP profile of the back metal layer (metal 2 showed in the figure) will become more uneven due to the dishing defect and erosion of the preceding metal layer and form so-called Laminated effect. Such effect will be worse with the increase of metal layer number, which will cause insurmountable difficulties in technology and integration, and affect the yield and the reliability of the product.

The development of the prior art make the design for manufacturability (DFM) technology the advanced design technique of improving chip yield proposed in recent years, and it has been already supported by a variety of automated design software. Such technique feedback the various effect and variability problem that may occur in the manufacturing process to the designer, so the designer may estimate the impact of the technology to the circuit in the early time of the design and optimize the layout to make the chip yield rate meet the expected requirement ultimately.

For the defective workmanship of the Cu chemical mechanical polishing technique (Cu-CMP) mentioned above, the DFM optimization method that the current industry used usually fill dummy pattern in the graphical blank area when doing wiring design to adjust the pattern density of the layout, so the pattern density may be consistent as far as possible in every area to improve the flatness of the surface of the metal. The existing method for filling dummy pattern can be summarized into two categories: rule-based dummy fill and model-based dummy fill.

Rule-based dummy fill divide the layout into separate windows according to specific size and fill dummy pattern to windows that have too low density. It also rules that metal density of each window must be within a predetermined range. Fill fixed dummy pre-designed in the blank area of the layout that the metal density of each window and the overall to achieve the requirements of the design rules. The advantage of this filling method is: simple, the running time is short and easy to implement, the layout designers only need to follow some very simple rules. The weakness of this method is that although it may improve the overall density of the metal, but it ignores some critical factor, such as the impact of the line width to the flatness after chemical snow polishing and so on, thus we can't control the variation of the thickness of the interlayer dielectric and the metal accurately. Furthermore, the purpose of this filling method is to improve the overall metal density uniformity by maximizing the density of the metal. It totally did not consider that large number of redundant metal pattern will increase the coupling capacitor of back metal layer and it may raise issues like signal delay and power consumption increase.

Model-based dummy fill design the solution of dummy fill by establishing the surface morphology model after Cu-CMP. This approach not only need to consider raising the uniformity of overall effective density, but also need to take into account the impact of the metal dimensions and density to the surface morphology after chemical mechanical polishing, at the same time, it may also adopt design rules like minimizing density difference and minimizing dummy pattern fill in according to the simulation result of the process model and the tangible impact to the product. The main purpose of the minimizing density difference method is to minimum the difference of density between the adjacent windows, while the purpose of the minimum fill level method which minimize the dummy pattern in the filling window is to reduce the parasitic electrical effects caused by dummy pattern. Model-based dummy fill method may get better effect of flatness in nanometer process node, but owing to extraction of simulation model and complicated fill algorithm, it have high requirements on events and resources which bring non-negligible negative impact to the design cycle and cost.

No matter the method of redundancy metal filling method is rule-based or model based, both of them have their own shortcomings. The development of modern technology requires the fast and effective injection techniques of dummy pattern, which can achieve better flattening effects and avoid overly complex algorithms to ensure the reasonable use of time and resources.

SUMMARY OF THE INVENTION

To solve the aforementioned problems in the injection techniques of redundant metal graphics, the present invention provides an algorithm of Cu interconnect dummy inserting.

An algorithm of Cu interconnect dummy inserting, comprising semiconductor chip on a substrate, said semiconductor chip including signal trace, said signal trace is mainly formed by patterning metal layer, wherein, including the following steps:

Step 1, divide the surface of semiconductor chip into several square windows with an area of A, each of which is non-overlapping. Each window is indicated by $A^{ij}$;

Step 2, Perform a logic operation on said each square window and said window is divided into two parts: the area to-be-inserted which need dummy pattern filling and it is indicated by $D_L$, L is any number from 1 to m; the non-inserting area which needn't dummy pattern to insert and it is indicated by $B_K$, K is any number from 1 to n, the partial pattern density of the non-inserting area is indicated by $\rho_K$;

Step 3, determine the metal density of the dummy pattern inserted in each square window, said metal density is indicated by $\rho_{d, ij}$, and the line width of the dummy pattern inserted in each square window, said line width is indicated by $W_{d, ij}$.

Step 4, determine the dummy pattern inserted to determine the dummy pattern inserted to each said window according to the metal density and line width, as well as pre-set dummy pattern and layouting rules;

The step of determine the metal density of said dummy pattern in the algorithm of Cu interconnect dummy inserting comprise:

Step a, calculated the average metal density of the non-inserting area, said average metal density is indicated by $\rho_{ij}$, the formula is:

$$\rho_{ij} = \frac{\sum_{1}^{K} \rho_K \cdot B_K}{\sum_{1}^{K} B_K}$$

Among them: $\rho_{ij}$ indicate the average metal density of said non-inserting area; $B_K$ indicate said non-inserting area with different number; $\rho_K$ indicate the metal density corresponding to the non-inserting area;

Step b, Adjust said metal density of each window, so that the density gradient of adjacent window will be in an preset allowed density fluctuation range; ultimately, determine the metal density of each window, said metal density is indicated by $\rho_{t, ij}$.

Step c, Calculate said metal density of dummy pattern that needs to-be-inserted in each window, said metal density is indicated by $\rho_{d, ij}$, the formula is:

$$\rho_{d,ij} = \frac{\rho_{t,ij} \cdot A - \rho_{ij} \cdot \sum_{i=1}^{K} B_i}{\sum_{i=1}^{L} D_i}$$

Among them: $\rho_{d, ij}$ indicates the metal density of dummy pattern that needs to-be-inserted; $\rho_{t, ij}$ indicates the target metal density that has been adjusted; $\rho_{ij}$ indicates the average metal density of non-inserting area; A is the size of each square window; $B_i$ indicates the non-inserting area with different number; $D_i$ indicate the area to-be-inserted with different number.

The algorithm of Cu interconnect dummy inserting, wherein the step of conforming the line width of dummy pattern inserted comprises:

Step a, determine the area-weighted average value, the average value is called effective line width which is indicated by $W_{ij}$.

Step b, Adjust the effective line width of each window, so that the effective line width of each adjacent window will be in an preset allowed line width fluctuation range;

Step c, define the effective line width described in said step b as the line width of dummy pattern that needs to-be-inserted in each said window, the line width is indicated by $W_{d, ij}$.

The algorithm of Cu interconnect dummy inserting, wherein determine whether each area to-be-inserted in each said window is connected to the area to-be-inserted in adjacent window and the difference of metal density, as well as the effective line width, of the dummy pattern is lower than the default; If the areas are connected and the difference is smaller than default, then merge adjacent areas and define the average metal density and average effective line width as the metal density and line width of the dummy pattern needs to-be-inserted. This may reduce the complexity of the dummy pattern insertion in the whole semiconductor chip.

For the step 2 in the algorithm of Cu interconnect dummy inserting, define the minimum distance between the dummy pattern needs to-be-inserted and signal trace as keep-out distance which is indicated by d, if the width between the blank area and the signal trace is smaller than the keep-out distance, the dummy pattern is not allowed.

The algorithm of Cu interconnect dummy inserting, wherein the preset dummy pattern is square, or rectangle, or cross, or T-shaped L-shaped, or any other geometric patterns.

The algorithm of Cu interconnect dummy inserting, wherein layouting rules of the dummy pattern is uniform filling mode or staggered filling mode, or any other laying mode of dummy pattern.

For said step b of determine the metal density of windows in the algorithm of Cu interconnect dummy inserting, the specific method of adjusting metal density of each said window is: determine whether the density different of any adjacent window exceed the default value $\Delta\rho$, if so, then calculate the average density of the region which including adjacent eight windows centered in a window which has lower density and replace the density value of the window by the average density, the value of the density is indicated by $\rho_{t, ij}$; Iterating the judgment process until the density difference between each adjacent window is under the default value. The iterative computations should not exceed a certain number to avoid the large amount of computation caused by not converge.

For said step b of determine the metal density of windows in the algorithm of Cu interconnect dummy inserting, the specific method of adjusting effective line width of each said window is: determine whether the effective line width difference of any adjacent window exceed the default value, if so, then calculate the average effective line width of the region which including adjacent eight windows centered in a window which has lower effective line width and replace the effective line width value of the window by the average effective line width; Iterating the judgment process until the effective line width difference value between each adjacent window is under the default value. The iterative computations should not exceed a certain number to avoid the large amount of computation caused by not converge.

The algorithm of Cu interconnect dummy inserting, wherein the size of said square window is from 20 um*20 um to 500 um*500 um, said minimum distance d between the dummy and the signal trace is from 0.1 um to 100 um.

The beneficial effect of the present invention is:
The present invention discloses an algorithm of Cu interconnect dummy inserting, which avoided the shortcomings of fill density maximization in the rule-based filling method by using reasonable metal density and line width. And with a combination of the influence of line width and density to the copper plating process and chemical mechanical polishing morphology in model-based filling method, it can achieve a better planarization effect.

DETAILED DESCRIPTION

The following context will make further description for the present invention in conjunction with appended drawings and specific embodiments, but not act as a limitation for the present invention.

An algorithm of Cu interconnect dummy inserting, comprising semiconductor chip on a substrate, semiconductor chip including signal trace, signal trace is mainly formed by patterning metal layer.

Figure 1:
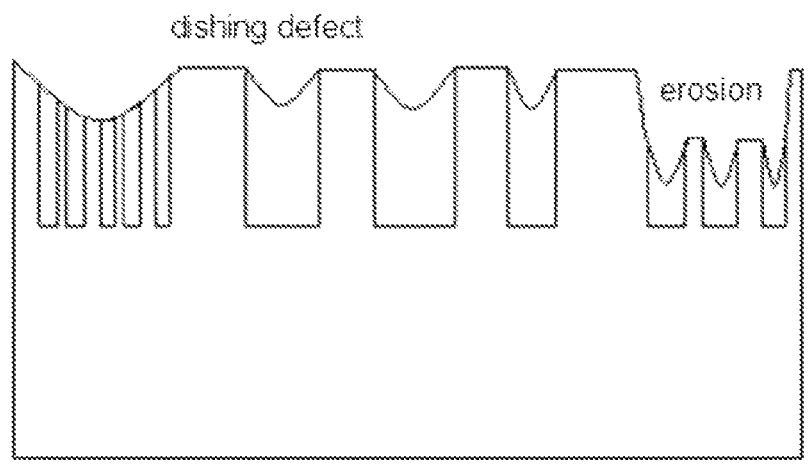
FIG. 1 illustrated the schematic diagram of the surface profile after the chemical mechanical polishing.
Figure 2:
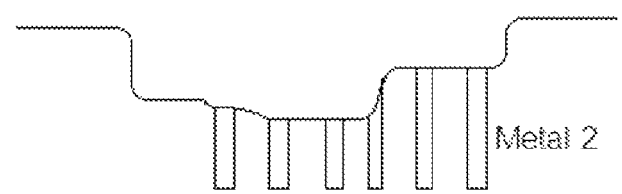
FIG. 2 illustrated the schematic diagram of laminated effect to the surface profile after the chemical mechanical polishing.
Figure 2:
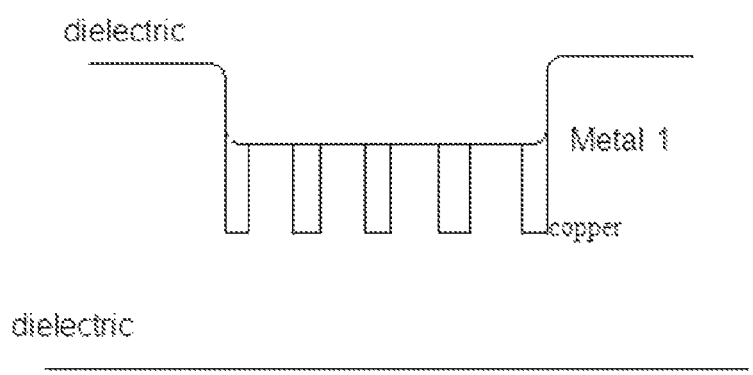
Figure 3:
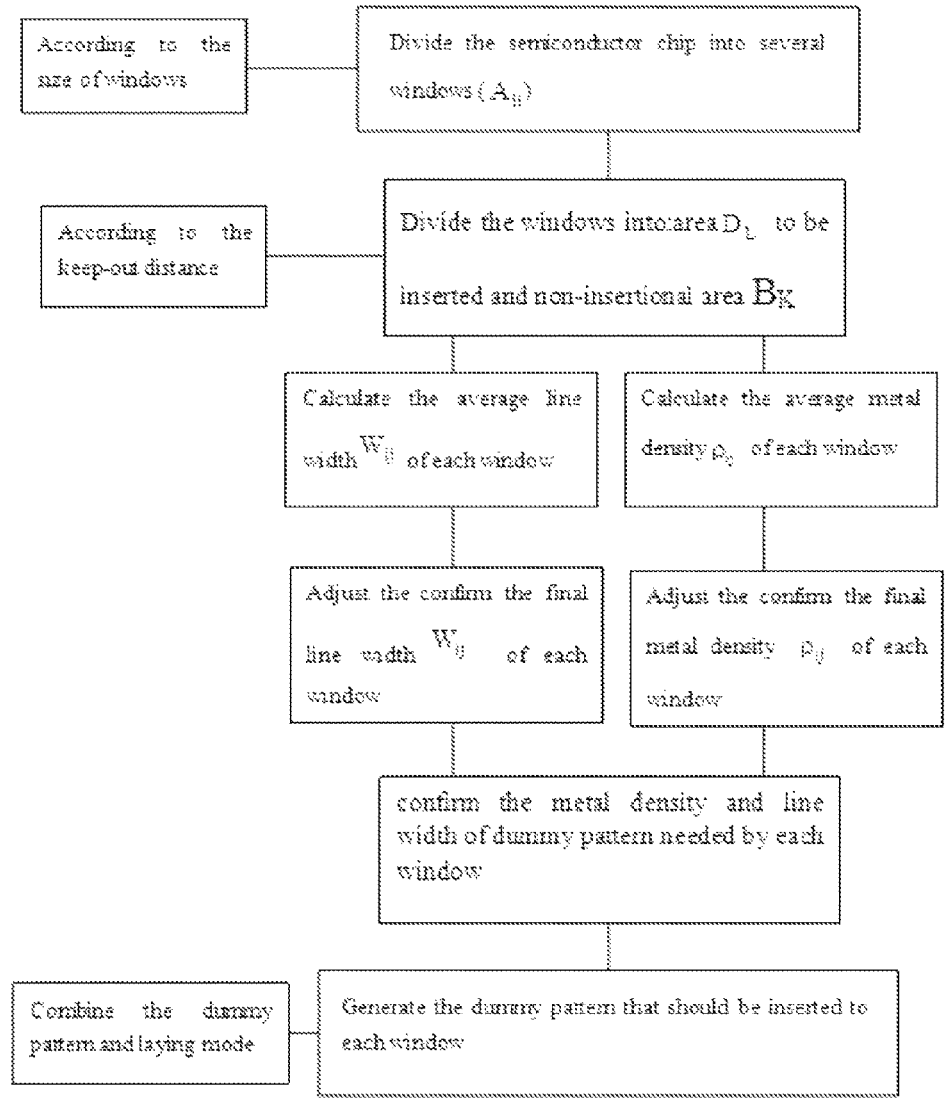
FIG. 3 illustrated the flow diagram of an algorithm of Cu interconnect dummy inserting according the disclosure.
Figures 4, 5:
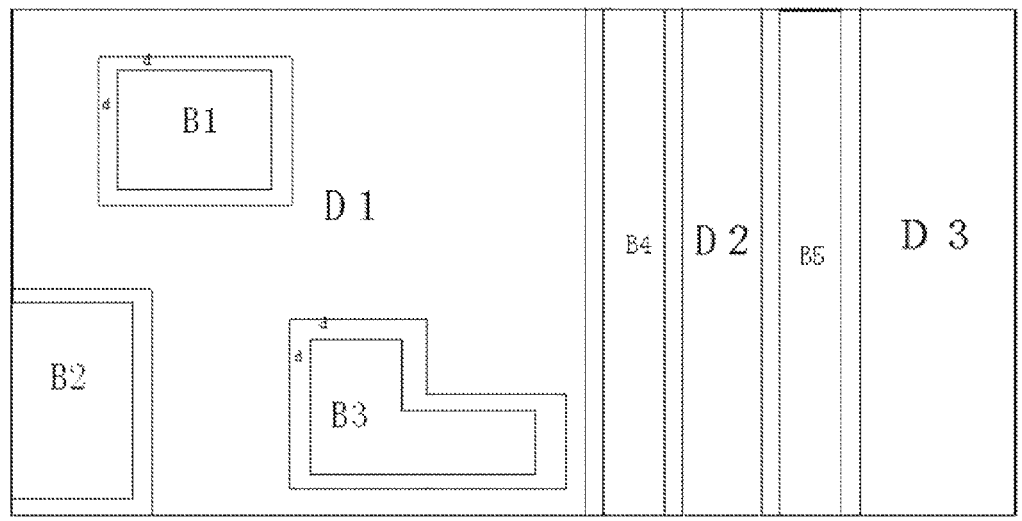
FIG. 4 illustrated the schematic diagram of the division to the semiconductor chip of an algorithm of Cu interconnect dummy inserting according the disclosure.
FIG. 5 illustrated the schematic diagram of the division to the window of an algorithm of Cu interconnect dummy inserting according the disclosure.

Illustrated as FIG. 3, the process of the inserting algorithm comprises the following steps:

Step 1, divide the surface of semiconductor chip into several square windows with an area of A illustrated as FIG. 4, each of which is non-overlapping. Each window is indicated by $A_{ij}$ (the sum of $A_{ij}$ is m*n);

Step 2, Perform a logic operation on each square window and the window is divided into two parts shown in FIG. 5: the area to-be-inserted which need dummy pattern filling and it is indicated by $D_L$, L is any number from 1 to m the non-inserting area which needn't dummy pattern to insert and it is indicated by $B_K$, K is any number from 1 to n, the partial pattern density of the non-inserting area is indicated by $\rho_K$;

Step 3, determine the metal density of the dummy pattern inserted in each square window, the metal density is indicated by $\rho_{d,\ ij}$, and the line width of the dummy pattern inserted in each square window, the line width is indicated by $W_{d,\ ij}$.

Step 4, determine the dummy pattern inserted to each window according to the metal density and line width, as well as pre-set dummy pattern and layouting rules;

The steps of determine the metal density of dummy pattern in the algorithm of Cu interconnect dummy inserting comprise:

Step a, calculate the average metal density of the non-inserting area ($\rho ij$), the formula is:

$$\rho_{ij} = \frac{\sum_{1}^{K} \rho_K \cdot B_K}{\sum_{1}^{K} B_K}$$

Among them: $\rho_{ij}$ indicates the average metal density of non-inserting area; $B_K$ indicates the non-inserting area with different number; $\rho_K$ indicates the metal density corresponding to the non-inserting area;

Step b, adjust the metal density of each window, so that the density gradient of adjacent window will be in an preset allowed density fluctuation range; ultimately, determine the metal density of each window, the metal density is indicated by $\rho_{t,\ ij}$.

Step c, calculate the metal density of dummy pattern that needs to-be-inserted in each window, the metal density is indicated by $\rho_{d,\ ij}$, the formula is:

$$\rho_{d,ij} = \frac{\rho_{t,ij} \cdot A - \rho_{ij} \cdot \sum_{i=1}^{K} B_i}{\sum_{i=1}^{L} D_i}$$

Among them: $\rho_{d,\ ij}$ indicates the metal density of dummy pattern that needs o-be-inserted; $\rho_{t,\ ij}$ indicates the target metal density that has been adjusted; $\rho_{ij}$ indicates the average metal density of non-inserting area; A is the size of each square window; $B_i$ indicates the non-inserting area with different number; $D_i$ indicates the area to-be-inserted with different number:

The algorithm of Cu interconnect dummy inserting, wherein the step of conforming the line width of dummy pattern inserted comprises:

Step a, determine the area-weighted average value, the average value is called effective line width which is indicated by $W_{ij}$.

Step b, adjust the effective line width of each window, so that the effective line width of each adjacent window will be in an preset allowed line width fluctuation range;

Step c, define the effective line width described in step b as the line width of dummy pattern that needs to-be-inserted in each window, the line width is indicated by $W_{d,\ ij}$.

The algorithm of Cu interconnect dummy inserting, wherein determine whether each area to-be-inserted in each window is connected to the area to-be-inserted in adjacent window and the difference of metal density, as well as the effective line width, of the dummy pattern is lower than the default; If the areas are connected and the difference is smaller than default, then merge adjacent areas and define the average metal density and average effective line width as the metal density and line width of the dummy pattern needs to-be-inserted. This may reduce the complexity of the dummy pattern insertion in the whole semiconductor chip.

For the step 2 in the algorithm of Cu interconnect dummy inserting, define the minimum distance between the dummy pattern needs to-be-inserted and signal trace as keep-out distance which is indicated by d, if the width between the blank area and the signal trace is smaller than the keep-out distance, the dummy pattern is not allowed.

The algorithm of Cu interconnect dummy inserting, wherein the preset dummy pattern is square, or rectangle, or cross, or T-shaped or L-shaped, or any other geometric patterns.

The algorithm of Cu interconnect dummy inserting, wherein layouting rules of the dummy pattern is uniform filling mode or staggered filling mode, or any other laying mode of dummy pattern.

For the step b of determine the metal density of windows in the algorithm of Cu interconnect dummy inserting, the specific method of adjusting metal density of each window is: determine whether the density different of any adjacent window exceed the default value $\Delta\rho$, if so, then calculate the average density of the region which including adjacent eight windows centered in a window which has lower density and replace the density value of the window by the average density, the value of the density is indicated by $\rho_{t,\,ij}$; Iterating the judgment process until the density difference between each adjacent window is under the default value. The iterative computations should not exceed a certain number to avoid the large amount of computation caused by not converge.

For the step b of determine the metal density of windows in the algorithm of Cu interconnect dummy inserting, the specific method of adjusting effective line width of each window is: determine whether the effective line width difference of any adjacent window exceed the default value $\Delta W$, if so, then calculate the average effective line width of the region which including adjacent eight windows centered in a window which has lower effective line width and replace the effective line width value of the window by the average effective line width; Iterating the judgment process until the effective line width difference value between each adjacent window is under the default value. The iterative computations should not exceed a certain number to avoid the large amount of computation caused by not converge.

The algorithm of Cu interconnect dummy inserting, wherein the size of the square window is from 20 um*20 um to 500 um 500 um, the minimum distance d between the dummy and the signal trace is from 0.1 um to 100 um.

The above is only the preferred embodiment of the present invention, not for limiting the patent application range of the present invention, so any modifications according to the description and figure of the present invention that have equal effect is under the scope of protection of the present invention.

What is claimed is:

1. A method for layout of Cu interconnect dummy inserting, on a semiconductor chip, comprising semiconductor chip on a substrate, said semiconductor chip including signal trace, said signal trace is mainly formed by patterning metal layer, wherein, including the following steps:

Step 1, divide the surface of semiconductor chip into several square windows with an area of A, each of which is non-overlapping, each window is indicated by $A_{ij}$;

Step 2, each said window is divided into two areas: a to-be-inserted area which need dummy pattern filling and it is indicated by $D_L$, L is any number from to 1 to m; and a non-inserting area which needn't dummy pattern and it is indicated by $B_K$, K is any number from 1 to n, a partial pattern density of the non-inserting area is indicated by $\rho_K$;

wherein determine the metal density of said dummy pattern comprises the following steps:

calculate the average metal density of the non-inserting area, said average metal density is indicated by $\rho_{ij}$, the formula is:

$$\rho_{ij} = \frac{\sum_{1}^{K} \rho_K \cdot B_K}{\sum_{1}^{K} B_K}$$

among them: $\rho_{ij}$ indicate the average metal density of said non-inserting area; $B_K$ indicate the different non-inserting area with different serial number; $\rho_K$ indicate the metal density corresponding to the non-inserting area;

adjust said metal density of each window, so that the density gradient of adjacent window will be in an preset allowed density fluctuation range; ultimately, confirm the metal density of each window, said metal density is indicated by $\rho_{t,\,ij}$;

calculate said metal density of dummy pattern that needs to-be-inserted in each window, said metal density is indicated by $\rho_{d,\,ij}$, the formula is:

$$\rho_{d,ij} = \frac{\rho_{t,ij} \cdot A - \rho_{ij} \cdot \sum_{i=1}^{K} B_i}{\sum_{i=1}^{L} D_i}$$

among them: $\rho_{d,\,ij}$ indicates the metal density of dummy pattern that needs to-be-inserted;

$\rho_{t,\,ij}$ indicates the metal density that has been adjusted; $\rho_{ij}$ indicates the average metal density of non-inserting area; A is the size of each square window; $B_i$ indicates the different non-inserting area with different serial number; $D_i$ indicate the different to-be-inserted area with different serial number;

wherein conforming the line width of dummy pattern inserted comprises the following steps:

calculate the area-weighted average value, the average value is called effective line width which is indicated by $W_{ij}$;

adjust the effective line width of each window, so that the effective line width of each adjacent window will be in an preset allowed line width fluctuation range;

define the effective line width described in said step b as the line width of dummy pattern that needs to-be-inserted in each said window, the line width is indicated by $W_{d,\,ij}$;

Step 3, determine a metal density of the dummy pattern inserted in each square window, said metal density is indicated by $\rho_{d,\,ij}$, and conform the line width of the dummy pattern inserted in each square window, said line width is indicated by $W_{d,\,ij}$; and Step 4, determine the dummy pattern inserted to each said window according to the metal density and line width, as well as pre-set dummy pattern and layouting rules.

2. The method of claim 1, wherein determine whether each to-be-inserted area in each said window is connected to the to-be-inserted area in adjacent window and the difference of metal density, as well as the effective line width, of the dummy pattern is lower than the default; if the areas are connected and the difference is smaller than default, then merge adjacent areas and define the average metal density and average effective line width as the metal density and line width of the dummy pattern needs to-be-inserted, thereby reducing the complexity of the dummy pattern insertion in the whole semiconductor chip.

3. The method of claim 1, wherein for said step 2, define the minimum distance between the dummy pattern needs to-be-inserted and signal trace as keep-out distance which is indicated by d, if the width between blank area and the signal trace is smaller than the keep-out distance, the dummy pattern is not allowed.

4. The method of claim 1, wherein the preset dummy pattern is square, or rectangle, or cross, or T-shaped or L-shaped, or any other geometric patterns.

5. The method of claim 1, wherein the laying mode of the dummy pattern is uniform tilling mode or staggered filling mode, or any other laying mode of dummy pattern.

6. The method of claim 1, wherein for said step b of confirming the metal density of windows, the specific method of adjusting metal density of each said window is: determine whether the density different of any adjacent window exceed the default value, if so, then calculate the average density of the region including adjacent eight windows centered in a window which has lower density and replace the density value of the window by the average density, the value of the density is indicated by $\rho_{t,\ ij}$; iterating the judgment process until the density difference between each adjacent window is under the default value, wherein the iterative computations should not exceed a certain number to avoid the large amount of computation caused by not converge.

7. The method of claim 1, wherein for said step b of confirming the metal density of windows in the algorithm of Cu interconnect dummy inserting, the specific method of adjusting effective line width of each said window is: determine whether the effective line width difference of any adjacent window exceed the default value, if so, then calculate the average effective line width of the region including adjacent eight windows centered in a window which has lower effective line width and replace the effective line width value of the window by the average effective line width; iterating the judgment process until the effective line width difference value between each adjacent window is under the default value, wherein the iterative computations should not exceed a certain number to avoid the large amount of computation caused by not converge.

* * * * *